(12) United States Patent
O'Leary et al.

(10) Patent No.: US 11,201,848 B2
(45) Date of Patent: Dec. 14, 2021

(54) DNS-BASED RANKING OF DOMAIN NAMES

(71) Applicant: Nominum, Inc., Redwood City, CA (US)

(72) Inventors: Paul O'Leary, San Francisco, CA (US); James Paugh, San Carlos, CA (US); Robert S. Wilbourn, Palo Alto, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 1215 days.

(21) Appl. No.: 14/937,656

(22) Filed: Nov. 10, 2015

(65) Prior Publication Data
US 2016/0065535 A1   Mar. 3, 2016

Related U.S. Application Data

(63) Continuation-in-part of application No. 13/177,504, filed on Jul. 6, 2011, now Pat. No. 9,185,127.

(51) Int. Cl.
*H04L 29/12* (2006.01)
*H04L 29/06* (2006.01)
(Continued)

(52) U.S. Cl.
CPC ........ *H04L 61/1511* (2013.01); *G06F 16/248* (2019.01); *G06F 16/24578* (2019.01);
(Continued)

(58) Field of Classification Search
CPC ............. H04L 61/1511; H04L 63/1441; H04L 2463/144
See application file for complete search history.

(56) References Cited

U.S. PATENT DOCUMENTS

| | | |
|---|---|---|
| 6,256,671 B1 | 7/2001 | Strentzsch et al. |
| 7,095,715 B2 | 8/2006 | Buckman et al. |
| | (Continued) | |

FOREIGN PATENT DOCUMENTS

GB   2481356 A   12/2011

OTHER PUBLICATIONS

Bilge, Leyla, et al., "Exposure: A Passive DNS Analysis Service to Detect and Report Malicious Domains", ACM Transactions on Information and System Security, vol. 16, No. 4, Article 14, Publication date: Apr. 2014, 28 pages. (Year: 2014).*

(Continued)

*Primary Examiner* — Scott A. Waldron

(57) ABSTRACT

Provided is a method for domain name ranking. An example method includes receiving Domain Name System (DNS) data, which includes domain names. The DNS data is processed to obtain multiple metric values for each of the domain names. The metric values can include a query count (QC), a client count (CC), and a network count (NC). The method proceeds with calculating a score for each of the domain names based on the metric values. The calculation can be performed using the following equation: Score=NC·CC·(1+log(QC)). Furthermore, the method ranks the domain names based on the score for each of the domain names. The ranking can be based on normalization of the scores or based on converting the scores into respective percentile ranks.

19 Claims, 5 Drawing Sheets

(51) Int. Cl.
*G06F 16/248* (2019.01)
*G06F 16/951* (2019.01)
*G06F 16/2457* (2019.01)

(52) U.S. Cl.
CPC ........ *G06F 16/951* (2019.01); *H04L 63/1441* (2013.01); *H04L 2463/144* (2013.01)

(56) References Cited

U.S. PATENT DOCUMENTS

| | | | |
|---|---|---|---|
| 7,472,201 B1* | 12/2008 | Aitken | H04L 29/12066 709/245 |
| 7,493,403 B2 | 2/2009 | Shull et al. | |
| 7,633,868 B2 | 12/2009 | Buckman et al. | |
| 7,761,583 B2 | 7/2010 | Shull et al. | |
| 8,079,087 B1 | 12/2011 | Spies et al. | |
| 8,090,679 B2* | 1/2012 | Zhuge | G06F 11/3419 707/603 |
| 8,224,942 B1 | 7/2012 | Presotto et al. | |
| 8,229,930 B2 | 7/2012 | Cohen et al. | |
| 8,260,914 B1* | 9/2012 | Ranjan | H04L 61/1511 709/224 |
| 8,341,745 B1 | 12/2012 | Chau et al. | |
| 8,499,077 B2 | 7/2013 | Niemela et al. | |
| 8,578,493 B1 | 11/2013 | Cowan et al. | |
| 8,606,926 B2 | 12/2013 | Ulevitch et al. | |
| 8,631,489 B2 | 1/2014 | Antonakakis et al. | |
| 8,682,812 B1 | 3/2014 | Ranjan | |
| 8,694,642 B2 | 4/2014 | Ulevitch et al. | |
| 8,701,190 B1 | 4/2014 | Chau et al. | |
| 8,874,550 B1* | 10/2014 | Soubramanien | G06F 17/30572 707/708 |
| 9,172,716 B2 | 10/2015 | Mugali, Jr. et al. | |
| 9,185,127 B2 | 11/2015 | Neou et al. | |
| 9,191,393 B2 | 11/2015 | Tovar | |
| 9,215,123 B1 | 12/2015 | Fears et al. | |
| 9,356,942 B1 | 5/2016 | Joffe | |
| 9,467,461 B2 | 10/2016 | Balderas | |
| 9,722,970 B2 | 8/2017 | Prince et al. | |
| 9,729,413 B2 | 8/2017 | Cook et al. | |
| 9,807,110 B2 | 10/2017 | Harlacher et al. | |
| 9,843,601 B2 | 12/2017 | Paugh et al. | |
| 10,084,814 B2 | 9/2018 | Fakeri-Tabrizi et al. | |
| 10,164,989 B2 | 12/2018 | Paugh et al. | |
| 10,587,646 B2 | 3/2020 | Fakeri-Tabrizi et al. | |
| 10,742,591 B2 | 8/2020 | Nguyen et al. | |
| 2005/0240576 A1* | 10/2005 | Piscitello | G06F 17/30657 |
| 2006/0010215 A1 | 1/2006 | Clegg et al. | |
| 2006/0036598 A1* | 2/2006 | Wu | G06F 17/30864 |
| 2006/0149674 A1 | 7/2006 | Cook et al. | |
| 2007/0028301 A1 | 2/2007 | Shull et al. | |
| 2007/0088550 A1 | 4/2007 | Filev et al. | |
| 2008/0028463 A1 | 1/2008 | Dagon et al. | |
| 2008/0082662 A1 | 4/2008 | Dandliker et al. | |
| 2008/0133540 A1* | 6/2008 | Hubbard | H04L 63/101 |
| 2008/0155694 A1 | 6/2008 | Kwon et al. | |
| 2008/0184357 A1 | 7/2008 | Drako et al. | |
| 2008/0201401 A1 | 8/2008 | Pugh et al. | |
| 2009/0043720 A1 | 2/2009 | Reznik et al. | |
| 2009/0055929 A1* | 2/2009 | Lee | H04L 29/12066 726/23 |
| 2009/0083413 A1 | 3/2009 | Levow et al. | |
| 2009/0254989 A1 | 10/2009 | Achan et al. | |
| 2009/0265786 A1 | 10/2009 | Xie et al. | |
| 2009/0282028 A1* | 11/2009 | Subotin | G06F 17/30705 |
| 2009/0323550 A1 | 12/2009 | Buckman et al. | |
| 2010/0037314 A1* | 2/2010 | Perdisci | H04L 63/1416 726/22 |
| 2010/0125911 A1* | 5/2010 | Bhaskaran | G06Q 10/10 726/23 |
| 2010/0235915 A1 | 9/2010 | Memon et al. | |
| 2010/0257024 A1* | 10/2010 | Holmes | G06Q 30/00 709/245 |
| 2010/0281536 A1* | 11/2010 | Richards | G06F 21/552 726/22 |
| 2011/0035469 A1* | 2/2011 | Smith | H04L 61/1511 709/220 |
| 2012/0042381 A1 | 2/2012 | Antonakakis et al. | |
| 2012/0158626 A1 | 6/2012 | Zhu et al. | |
| 2012/0198549 A1 | 8/2012 | Antonakakis et al. | |
| 2012/0259954 A1 | 10/2012 | McCarthy et al. | |
| 2012/0304244 A1 | 11/2012 | Xie et al. | |
| 2012/0324113 A1 | 12/2012 | Prince et al. | |
| 2013/0014253 A1 | 1/2013 | Neou et al. | |
| 2013/0031626 A1 | 1/2013 | Kim et al. | |
| 2013/0117282 A1 | 5/2013 | Mugali, Jr. et al. | |
| 2014/0068775 A1 | 3/2014 | Ward et al. | |
| 2014/0215628 A1 | 7/2014 | Yan | |
| 2015/0074221 A1* | 3/2015 | Kuparinen | H04L 29/12066 709/214 |
| 2015/0074807 A1 | 3/2015 | Turbin | |
| 2015/0128263 A1 | 5/2015 | Raugas et al. | |
| 2015/0365305 A1* | 12/2015 | Namata | H04L 43/062 705/14.54 |
| 2016/0065534 A1 | 3/2016 | Liu et al. | |
| 2016/0065597 A1 | 3/2016 | Nguyen et al. | |
| 2016/0065611 A1 | 3/2016 | Fakeri-Tabrizi et al. | |
| 2016/0099961 A1 | 4/2016 | Paugh et al. | |
| 2016/0294852 A1 | 10/2016 | Hagen | |
| 2017/0142150 A1 | 5/2017 | Burns et al. | |
| 2017/0163754 A1 | 6/2017 | Johnson | |
| 2018/0176241 A1 | 6/2018 | Manadhata et al. | |
| 2018/0183830 A1 | 6/2018 | Wessels et al. | |

OTHER PUBLICATIONS

Non-Final Office Action, dated Jun. 13, 2017, U.S. Appl. No. 14/937,699, filed Nov. 10, 2015.
Non-Final Office Action, dated Oct. 10, 2012, U.S. Appl. No. 13/177,504, filed Jul. 6, 2011.
Final Office Action, dated Jun. 27, 2013, U.S. Appl. No. 13/177,504, filed Jul. 6, 2011.
Non-Final Office Action, dated Sep. 19, 2014, U.S. Appl. No. 13/177,504, filed Jul. 6, 2011.
Final Office Action, dated Mar. 23, 2015, U.S. Appl. No. 13/177,504, filed Jul. 6, 2011.
Notice of Allowance, dated Jul. 14, 2015, U.S. Appl. No. 13/177,504, filed Jul. 6, 2011.
U.S. Appl. No. 15/799,547, Non-Final Office Action dated Feb. 7, 2018, 12 pages.
U.S. Appl. No. 14/937,699, Final Office Action dated Dec. 21, 2017, 34 pages.
U.S. Appl. No. 14/937,699, Advisory Office Action dated Mar. 14, 2018, 4 pages.
U.S. Appl. No. 14/937,699 Notice of Allowance dated Dec. 4, 2019, 20 pages.
U.S. Appl. No. 16/107,627, Notice of Allowance dated Oct. 30, 2019, 13 pages.
U.S. Appl. No. 14/937,699 Notice of Allowance dated Apr. 15, 2020, 21 pages.
U.S. Appl. No. 14/937,699 Notice of Allowance dated Jan. 17, 2019, 55 pages.
U.S. Appl. No. 14/937,699 Notice of Allowance dated Jun. 19, 2019, 19 pages.
U.S. Appl. No. 14/937,616, Non-Final Office Action dated Apr. 6, 2018, 18 pages.
U.S. Appl. No. 16/107,627, Non-Final Office Action dated Dec. 14, 2018, 21 pages.
U.S. Appl. No. 14/937,616, filed Nov. 10, 2015.
U.S. Appl. No. 14/943,908, filed Nov. 17, 2015.
U.S. Appl. No. 16/107,627, filed Aug. 21, 2018.
U.S. Appl. No. 16/197,606, filed Feb. 13, 2019.
U.S. Appl. No. 16/274,351, filed Feb. 13, 2019.
U.S. Appl. No. 13/177,504, filed Jul. 6, 2011.
U.S. Appl. No. 14/937,699, filed Nov. 10, 2015.
U.S. Appl. No. 15/799,547, filed Oct. 31, 2017.

* cited by examiner

DNS-BASED RANKING OF DOMAIN NAMES

CROSS-REFERENCE TO RELATED APPLICATIONS

The present application is a continuation-in-part of, and claims the priority benefit of, U.S. patent application Ser. No. 13/177,504 filed on Jul. 6, 2011, entitled "Network Protection Service," now U.S. Pat. No. 9,185,127 issued on Nov. 10, 2015, the disclosure of which is incorporated herein by reference in its entirety for all purposes.

TECHNICAL FIELD

This disclosure relates generally to data processing. More specifically, this disclosure relates to systems and methods for ranking domain names based on Domain Name System (DNS) data.

BACKGROUND

Domain names help identifying locations where certain information or services can be located on a public or private network. Domain names are typically formed by the rules and procedures associated with the DNS. Domain names can be used for various naming and addressing purposes. In general, a domain name represents an underlying Internet Protocol (IP) resource, such as a personal computer, a server hosting website pages, or a website page or service communicated via the Internet. Thus, the DNS allows translating domain names (such as "www.example.com") into the corresponding IP address (such as "123.4.56.78") needed to establish Transmission Control Protocol/Internet Protocol (TCP/IP) communications over the Internet.

Currently, the Internet includes billions of website pages, services, storage and computational resources, all having unique domain names and IP addresses. Website ranking is one of the important tools for various online services, such as, for example, search engines. Traditionally, the website ranking has been used as a measure of popularity or significance of website pages. Some common examples of website ranking engines include Google® PageRank and Alexa® ranking.

Historically, one approach for the website ranking is based on the premise that the popularity of a website is proportional to the number of web sites that link to the web site and the popularity of the web sites that link to the web site. Another approach includes counting the number of access requests associated with a website.

However, the traditional approaches for ranking websites have multiple issues. First, the known methods typically rank only core domain names without accounting for subdomain names. Second, the known methods focus on human-readable website pages and do not account for domain names that are associated with web services, Application Programming Interface (API) based services, and so forth but do not have associated web pages. Third, the known methods can be vulnerable to network security problems, which means they can rank domain names associated with a malicious activity, fraud, phishing, propagation of malware, and the like. Fourth, the known methods are limited to ranking a limited number of website pages. For example, Alexa® only ranks one million top website pages. Additionally, the existing website ranking technologies are limited to websites.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure concerns a method and system for domain name ranking. In some example embodiments, the method includes receiving Domain Name System (DNS) data, which includes domain names, such as, for example, website names and domain names used for non-web communication. The DNS data is received from one or more DNS servers of two or more Internet Service Providers (ISPs). The DNS data can be processed to obtain multiple metric values for each of the domain names. The metric values can include a query count (QC), a client count (CC), and a network count (NC). Furthermore, the method calculates a score for each of the domain names based on the metric values. The calculation can be based on applying the following equation to the metric values: Score=NC·CC·(1+log(QC)). Furthermore, the method can rank the domain names based on the score for each of the domain names. The ranking can be based on normalization of the scores or converting the scores of the domain names into percentile ranks.

In certain embodiments, the domain names include one or more Fully Qualified Domain Names (FQDNs), one or more core domain names, and one or more subdomain names, and wherein the scores are calculated for each of the FQDNs, the core domain names, and the subdomain names. Thus, the calculating of the score for each of the core domain names can include combining scores of the subdomain names, which are associated with the same core domain name.

In certain embodiments, the DNS data includes DNS data collected during a predetermined period, wherein the predetermined period ranges from about 1 hour to about 24 hours. In some embodiments, the method may further comprise sorting the domain names based on the scores of the domain names and causing to display at least a partial list of the domain names along with their corresponding ranks.

In certain embodiments, the method further comprises receiving historical DNS data, which includes domain names with their respective historical scores periodically calculated during a predetermined period. Each of the domain names from the historical DNS data can also include multiple historical scores. The method further comprises calculating a deviation metric for each of the domain names by comparing the scores of the domain names to the historical scores.

In some embodiments, the DNS data can be filtered based on the metric values. The filtering can include removing domain names which are associated with a QC being equal to one or a CC being equal to one, removing domain names associated with malware or malicious activity, removing domain names having invalid or unreadable characters, removing domain names associated with a predetermined Internet Protocol (IP) standard (e.g., IPv4), removing domain names associated with a predetermined domain name type, and the like.

In some embodiments, the calculating of the score for each of the domain names includes calculating a local score for each of the domain names and calculating a global score for each of the domain names. The local scores of the domain names can be calculated based on local DNS data acquired from a single ISP, while the global scores of the domain names can be calculated based on global DNS data acquired from a plurality of ISPs. The global scores of the domain names can be transmitted to one or more ISPs.

According to another aspect of this disclosure, there is provided a system comprising at least one processor and at least one memory storing processor-executable codes. The at least one processor is configured to implement the aforementioned method for domain name ranking.

According to yet another aspect of this disclosure, there is provided a non-transitory processor-readable medium having instructions stored thereon. When these instructions are executed by one or more processors, they cause the one or more processors to implement the above-described methods for domain name ranking.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF DRAWINGS

Exemplary embodiments are illustrated by way of example and not limitation in the figures of the accompanying drawings, in which like references indicate similar elements.

DETAILED DESCRIPTION

Figure 1:
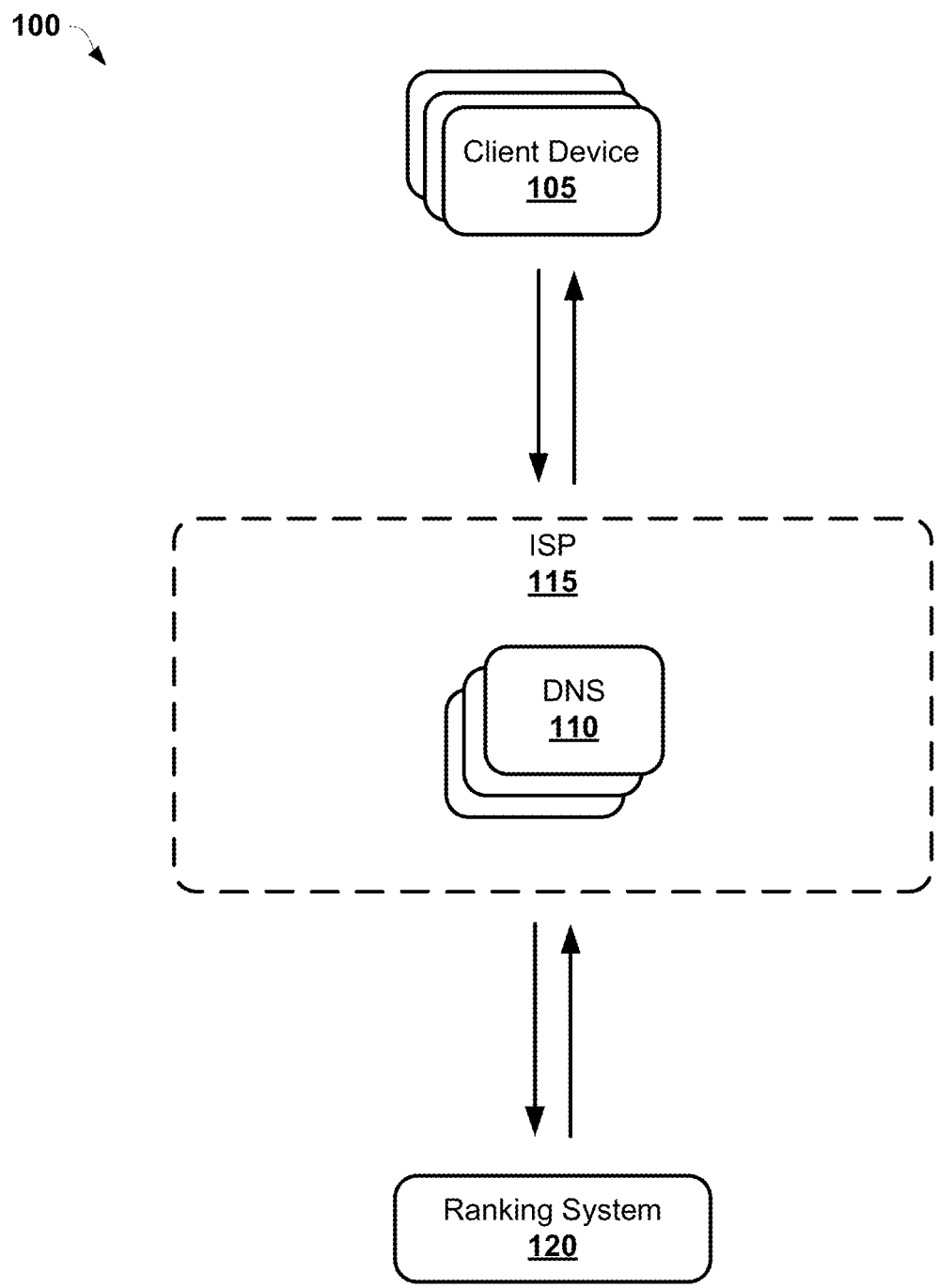
FIG. 1 is a block diagram of an example computer network environment suitable for practicing methods for ranking of domain names as described herein.

The technology disclosed herein is concerned with domain name ranking, which overcomes at least some drawbacks of existing methods. According to various embodiments of this disclosure, the ranking of domain names is based on aggregating and analyzing DNS data from one or more ISPs. This approach differs from prior art methods in that it does not only analyze domain names appearing in the web traffic, but also analyzes domain names appearing in the Internet-of-Things (IoT) traffic, machine-to-machine (m2m) traffic, API-based traffic, and the like. In other words, this disclosed technology allows for analyzing global DNS traffic, which includes DNS queries generated by users (e.g., via a browser) and DNS queries generated automatically by machines or processes. Moreover, this technology does not only analyze core domain names, but also subdomain names, Fully Qualified Domain Names (FQDNs), and optionally other domain names and hostnames. Furthermore, the present technology allows ranking domain names based on DNS data collected over predetermined periods/fragments of time, for example, hourly fragments, daily fragments, weekly fragments, monthly fragments, and so forth. Ultimately, this provides better flexibility for analysis of domain name reputations. In some embodiments, the present technology can be used in addition to existing methods for website ranking, including Google® PageRank, Alexa® ranking, and the like.

In general, the present technology receives DNS data from one or more DNS servers, which accumulate the DNS data from DNS queries for resolution of domain names. Thus, the DNS data can include domain names and also some DNS query related data such as an IP address of a client generating a DNS request, a time stamp of the DNS request, a DNS query name, a DNS query type, among other things. The DNS data can be supplied in fragments accumulated over a predetermined period (e.g., ranging from minutes to years). Furthermore, certain metric values for each or some of the domain names appearing in the DNS data can be retrieved from the DNS data. These metric values can include a query count (QC), a client count (CC), a network count (NC), among others. Furthermore, a score can be calculated for at least some of the domain names appearing in the DNS data based on the QC, CC, and NC values. In some embodiments, prior filtering of DNS data or domain names can be performed to reduce noise, exclude domain names associated with malicious activities, exclude rare or invalid domain names, and so forth. Once the scores for the domain names are calculated, the scores can be, optionally, normalized and/or converted into percentile ranks. These ranks are then assigned to the corresponding domain names and associated with corresponding periods when the DNS data was acquired. For example, the ranks can relate to hourly ranks, daily ranks, weekly ranks, and the like.

Finally, the ranks of the domain names can be used for various analytics. This may include generating lists or tables of the domain names, sorting the domain names by rank, and so forth. When the ranks are combined with historical data (e.g., ranks of the same domain names calculated for previous periods), additional analytics can become available, such as calculating a mean rank for a certain domain name, calculating a standard deviation of rank values, calculating a rate at which a particular domain name appears in a traffic fragment, determining minimum and maximum peak values of the ranks, and so forth. In some embodiments, the rank information can be visualized and displayed via a graphical user interface (GUI) in the form of lists, tables, graphs, charts, domain name maps, domain name trends, and so forth. In yet further embodiments, the rank information can be used for identifying high-risk domains, botnets, distributed denial-of-service (DDoS) attacks, malicious domain names, phishing domain names, anomaly domain names, suspicious domain names, and so forth. The analysis of domain name ranking information can be performed manually, be automated, or include a combination of both. There can be provided various software-based analytics tools, visualization tools, tools for organizing and monitoring the rank information. Moreover, the rank information can also be transmitted to third parties (e.g., to one or more ISPs) for further analysis.

In yet further embodiments, the rank information can be combined with website rank information obtained from other sources. First, the rank information can be analyzed for purposes of validation or cross-validation. Second, the rank information from two sources can be mutually complementary, which is especially important in instances of some ISPs failing to share DNS data.

For purposes of this patent document, it is important to define certain terminology used herein as follows. The terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." Additionally, all ranges provided herein include the upper and lower values of the range unless explicitly noted. For example, the term "about" shall mean a reasonable deviation of a value accompanying this term.

Furthermore, the term "DNS" shall have its ordinary meaning of Domain Name System, which represents a hierarchical distributed naming system for computers, servers, content, services, or any resource available via the Internet or private network. The terms "domain" and "domain name" shall be given its ordinary meaning such as a network address to identify the location a particular web resource, content, service, computer, server, and so forth. In certain embodiments, domain names can identify one or more IP addresses. Each domain name can be made up of a series of character strings separated by dots. The right-most label in a domain name is known as the "top-level domain" such as ".com," ".org" and the like. Each top-level domain supports second-level domains, such as the "example" level in "www.example.com." Each second-level domain can include a number of third-level domains located immediately to the left of the second-level domain, e.g. the "www" level in "www.example.com." There can be additional level domains as well, with virtually no limits. For example, a domain with additional domain levels could include "www.photos.example.com." In this disclosure, the term "core domain name" shall mean a parent domain, which is a combination of a second-level domain and a top-level domain, e.g. "example.com." The term "subdomain name" shall mean one or more additional domain levels, hostnames, and the like. Furthermore, the term "Fully Qualified Domain Name" or FQDN shall mean the complete domain name for a specific computer, server, or host. The FQDN may consist of two parts: a subdomain name (hostname) and a core domain name.

The term "query count" or QC shall mean a number of instances or a frequency of individual DNS queries associated with a particular domain name, which appear or present in a given data set (e.g., in a given DNS data fragment). The term "client count" or CC shall mean a number of instances or a frequency of individual DNS queries associated with a particular client or a user, which appear or present in a given data set with respect to one or more domain names. The term "network count" or NC shall mean a number of instances or a frequency of individual DNS queries associated with a particular network, such as a local area network (LAN) or local network architecture, which appear or present in a given data set with respect to one or more domain names.

Referring now to the drawings, various embodiments will be described, wherein like reference numerals represent like parts and assemblies throughout the several views. It should be noted that the reference to various embodiments does not limit the scope of the claims attached hereto. Additionally, any examples set forth in this specification are not intended to be limiting and merely set forth some of the many possible embodiments for the appended claims.

FIG. 1 shows a block diagram of an example computer network environment 100 suitable for practicing the methods for ranking of domain names as described herein. It should be noted, however, that the environment 100 is just one example embodiment provided for illustrative purposes and reasonable deviations of this embodiment are possible.

As shown in FIG. 1, there is provided a client device 105 (also referred herein to as "client" for simplicity). The client device 105 is generally any appropriate computing device having network functionalities allowing communicating under any existing IP protocols (e.g., IPv4, IPv6). Some examples of the client devices 105 include, but are not limited to, a computer (e.g., laptop computer, tablet computer, desktop computer), cellular phone, smart phone, gaming console, multimedia system, smart television device, set-top box, infotainment system, in-vehicle computing device, informational kiosk, robot, smart home computer, home appliance device, IoT device, software application, computer operating system, modem, router, and so forth. The environment 100 may include multiple client devices 105. The client devices 105 can include computers operated by users and also devices operated by a robot or software.

The client device 105 can make certain client inquires to the computer network environment 100, such as a request to open a website in a browser, download a file from the Internet, access a web service via a software application, and so forth. A client inquiry may include a DNS query associated with a domain name (e.g., in the form of "www.nominum.com"), which requires the resolution by a DNS server into one or more corresponding IP addresses. The DNS query initiated by the client device 105 can be transmitted to a recursive DNS server, or simply, DNS 110, which can be associated with a particular ISP 115. The ISP 115 can include a plurality of DNSs 110. For purposes of this patent document, the terms "DNS query," "DNS inquiry," and "DNS request" may mean the same and therefore can be used interchangeably.

The DNS 100 can resolve the DNS query and return an IP address associated with the domain name of the DNS query. The IP address can be delivered to the client 105. In certain embodiments, the DNS query includes the following data: an IP address of the client 105, a time stamp of the DNS inquiry, DNS query name (e.g., a domain name), and/or a DNS query type. The DNS data can be aggregated or stored in a cache of DNS 100.

Still referring to FIG. 1, there is shown a ranking system 120 for ranking of domain names. The ranking system 120 may be implemented on a server, a plurality of servers or provided via a cloud-based domain name ranking service. The ranking system 120 can include hardware modules (e.g., decision-making logic, dedicated logic, programmable logic, application-specific integrated circuit (ASIC)), software modules (e.g., software run on a general-purpose computer system or a dedicated machine, microcode, computer instructions), or a combination of both. The ranking system 120 can be in operative communication with the ISP 115, including any devices of the ISP 115 such as the DNS 110.

The ranking system 120 can receive, from the ISP 115 or the DNS 110 data communications including DNS, data collected during processing of DNS queries received from the clients 105. The DNS data can be supplied as a "live stream" from DNS 110 to the ranking system 120, i.e. in real time. In alternate embodiments, the DNS data can be provided to the ranking system 120 in chunks or fragments, where each fragment can include DNS queries aggregated by the DNS 110 during a predetermine period. This predetermined period can range from minutes to years. For example, the DNS data can include 10-minute DNS data fragments, 1-hour DNS data fragments, 24-hour DNS data fragments, and so forth. As mentioned above, the DNS data can include multiple DNS queries, each of which has a domain name (e.g., a core domain name, a subdomain name, or FQDN) and DNS related data (e.g., network characteristic or network address, client address, query type, time stamp, and so forth).

The ranking system 120 can be configured to process the received DNS data by retrieving domain names and certain metric values including QC, CC, and NC for each domain name. The metric values can be then combined into a single metric, which can be referred to as a score. The score can be a numerical representation and calculated using the following equation:

$$\text{Score} = NC \cdot CC \cdot (1 + \log(QC)) \quad \text{(Eq. 1)}$$

Those skilled in the art will appreciate that other equations can also be used for calculating the score. Moreover, in certain embodiments, the metric values or the score can be used for filtering the DNS data. For example, those FQDNs that are associated with QC=1 and CC=1 can be presented by their core domain only in the DNS data or optionally removed from the DNS data. Thus, in certain embodiments, the ranking system 120 filters all domain names that have QC=1 and CC=1, but process those domain names that have QC>1 or CC>1.

In yet further embodiments, the ranking system 120 can filter or remove domain names which are associated with malware, fraud, phishing attacks, or any other malicious or even suspicious activity. For example, domain names associated with Pseudo Random Subdomain Attack (PRSD) can be removed from a set of domain names.

In other embodiments, the ranking system 120 can filter or remove domain names which have invalid or unreadable characters. For example, any non-Latin character characters can be removed. Or any character not in the character class {a-zA-z0-9_-.}.

In other embodiments, the ranking system 120 can filter or remove domain names which are associated with a predetermined IP standard, such as IP version 4 (IPv4). Moreover, in some embodiments, the ranking system 120 can filter or remove domain names which are associated with a predetermined domain name type such as Address and Routing Parameter Area (ARPA) related domain names (e.g., "in-addr.arpa," "ip6.arpa," and the like).

When there are one or more subdomain names present in the DNS data for a particular domain name, a score of the domain name can be calculated as a sum of scores calculated for the respective subdomain names. In other embodiments, a score of the domain name can be calculated as an average or median of scores calculated for the respective subdomain names.

In certain embodiments, when the ranking system 120 calculates scores for a plurality of the domain names of the DNS data, the scores can be optionally converted or normalized. For example, each score can be converted to a percentile rank (between 0 and 1) using a suitable percentile rank equation. The normalization of scores can be required for reducing memory space needed for storing this information. Moreover, the normalization can remove the variation caused by changes in the DNS data and also simplify the process of setting thresholds and cut-off values in further data analysis.

Furthermore, the domain names with their respective percentile ranks can be sorted and displayed. The displaying may be provided via the GUI and presented in any suitable manner. For example, the domain names with their respective percentile ranks can be displayed using one or more tables, charts, lists, graphs, maps, images, or any combination thereof.

Figure 2:
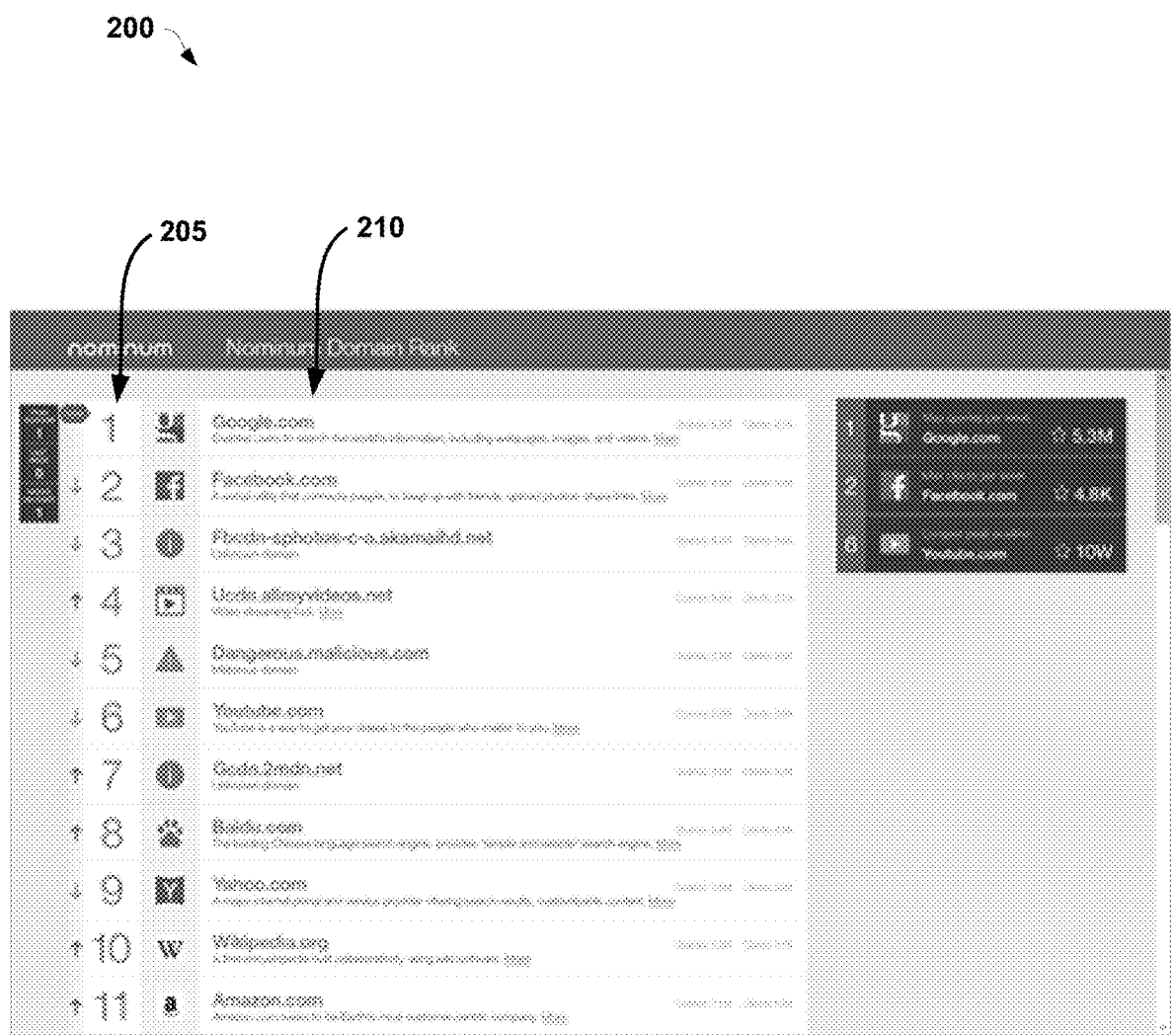
FIG. 2 is an example graphical user interface showing a table of domain names with their respective ranks calculated using methods described herein.

FIG. 2 is an example GUI 200 showing a table of domain names with their respective ranks calculated using the methods described herein. As shown in the figure, the table includes a rank column 205 and a domain name column 210. The domain names can be sorted in the table by their rank value.

In some embodiments, a visualization of ranked domain names can be performed with respect to a certain number of ranks determined during a predetermined period. For example, the visualization can include one or more graphs showing how a rank of a particular domain name has changed over a 30-day period or any other period. In these aspects, the ranking system 120 can receives historical DNS data from a storage or DNS 110. The historical DNS data can includes the domain names with their respective historical scores or ranks periodically calculated during a predetermined period (e.g., hourly, daily, weekly, and so forth). Each domain name from the historical DNS data can includes multiple historical scores or ranks. In some embodiments, the historical scores or ranks can be displayed together with recently calculated ranks. Moreover, new and historical scores (ranks) can be compared to each other for analytics purposes. For example, the ranking system 120 can calculate a deviation metric for each of the domain names by comparing the scores of the domain names with the historical scores.

In yet further embodiments, the visualization of ranked domain names can include formation of two lists (or tables), where one list relates to ranked FQDNs and the other list relates to ranked core domains. One example of this visualization example is presented below in Table 1:

TABLE 1

| Absolute Rank | Core Domain | Rank | FQDN | Rank |
|---|---|---|---|---|
| 1 | apple.com | 0.99999990 | www.apple.com. | 0.99999969 |
| 2 | google.com | 0.99999970 | android.clients.google.com. | 0.99999906 |
| 3 | facebook.com | 0.99999948 | mqtt.c10r.facebook.com. | 0.99999753 |
| 4 | akamaihd.net | 0.99999932 | fbstatic-a.akamaihd.net. | 0.99999611 |
| 5 | akadns.net | 0.99999910 | ads.flurry.com. | 0.99999468 |
| 6 | googleapis.com | 0.99999879 | accounts.google.com. | 0.99999129 |
| 7 | akamai.net | 0.99999852 | gs-loc.ls-apple.com.akadns.net. | 0.99999022 |
| 8 | doubleclick.net | 0.99999840 | cm.g.doubleclick.net. | 0.99998833 |
| 9 | whatsapp.net | 0.99999812 | googleapis.l.google.com. | 0.99998675 |
| 10 | akamaiedge.net | 0.99999808 | e673.e9.akamaiedge.net. | 0.99998461 |
| 11 | instagram.com | 0.99999804 | s.youtube.com. | 0.99998377 |
| 12 | microsoft.com | 0.99999781 | www.googletagservices.com. | 0.99998113 |
| 13 | gstatic.com | 0.99999755 | lh3.googleusercontent.com. | 0.99998111 |

TABLE 1-continued

| Absolute Rank | Core Domain | Rank | FQDN | Rank |
|---|---|---|---|---|
| 14 | fbcdn.net | 0.99999722 | appspot.l.google.com. | 0.99997849 |
| 15 | icloud.com | 0.99999719 | telegraph-ash.instagram.com. | 0.99997615 |
| 16 | yahoo.com | 0.99999708 | profile.ess.apple.com. | 0.99997466 |
| 17 | amazonaws.com | 0.99999664 | photos-e.ak.instagram.com. | 0.99997436 |
| 18 | google-analytics.com | 0.99999635 | us-courier.push-apple.com.akadns.net. | 0.99997393 |
| 19 | twitter.com | 0.99999625 | go.microsoft.com. | 0.99997282 |
| 20 | yahooapis.com | 0.99999623 | events-endpoint-b-1623273513.us-east-1.elb.amazonaws.com. | 0.99997244 |

In yet further embodiments, the ranking system 120 can provide various automatic, semi-automatic, or manual tools for analysis of ranked domain names. The ranking system 120 can produce basic descriptive statistics per domain name, including a mean rank, a standard deviation of a rank, a rate at which a particular domain names appears in a DNS data fragment, a date when a certain domain name was first seen in the DNS data, a maximum peak value of a rank, a minimum peak value of a rank, a date or a time when a maximum peak value of a rank was detected, and so forth. Thus, output values of a list or a table produced by the ranking system 120 can include the following: "name" (e.g., a FQDN or core domain name), "norm-mean" (i.e., a normalized mean rank for n days, including zero score days), "mean" (i.e., a mean rank value for n days, for only non-zero score days), "stddev" (i.e., a standard deviation of rank for n days, including zero score days), "rate" (i.e., a rate at which a certain domain name was scored non-zero of days), "first date" (i.e., a first date when a particular domain name seen in data), "peak date" (i.e., a date of highest rank over n days), "peak" (i.e., a highest rank over n days), and so forth.

Figure 3:
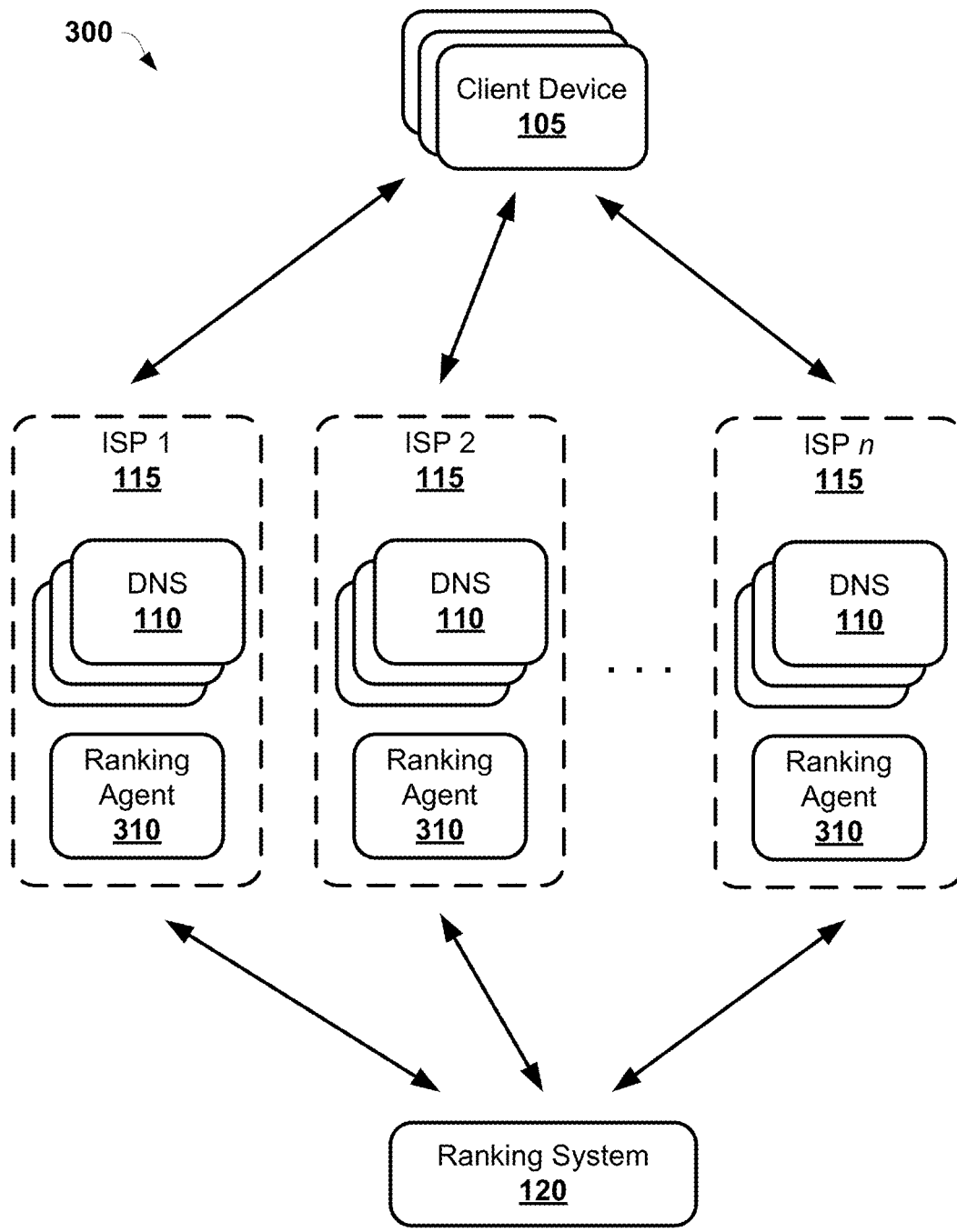
FIG. 3 is a block diagram of another example computer network environment suitable for practicing methods for ranking of domain names as described herein.

FIG. 3 shows a block diagram of another example computer network environment 300 suitable for practicing the methods for ranking of domain names described herein. It should be noted, however, that the environment 300 is just one example embodiment provided for illustrative purposes and reasonable deviations from this embodiment are possible.

As shown in FIG. 3, the system environment 300 includes the ranking system 120, which is generally same or similar to what was described above with reference to FIG. 1. The difference, however, lies in multiple ISPs 115, which are in operative communication with the ranking system 120.

In this example embodiment, some or all of the ISPs 115 include one or more DNSs 110 which can aggregate DNS data as described above. Moreover, some or all of the ISPs 115 include a ranking agent 310. Generally, the ranking agent 310 is configured to produce local ranks of domain names within a corresponding ISP 115 based on the DNS data generated by this ISP 115. The operation of the ranking agent 310 is the same or substantially similar to the operation of the ranking system 120 described above. Thus, the ranking agent 310 can include hardware modules (e.g., decision-making logic, dedicated logic, programmable logic or ASICs), software modules (e.g., software run on a general-purpose computer system or a dedicated machine, microcode, computer instructions), or a combination of both.

In some example embodiments, some or all of the ISPs 115 can share DNS data with the ranking system 120. Thus, when DNS data is received from multiple IPSs 115, this data constitutes global DNS data. As was mentioned above, the global DNS data can be used by the ranking system 120 to calculate global scores of domain names. Furthermore, the global scores of domain names can be shared back with one or more of the ISPs 115.

Furthermore, in certain embodiments, some of the ISPs 115 include the agent 310 for generating local scores of domain names. The local scores can be kept in secret by certain ISPs 115, however some other ISPs 115 can share the local scores of domain names with other ISPs 115 or the ranking system 120. The local scores can be calculated solely based on DNS data available at certain DNSs 110 or ISPs 115.

In some embodiments, when the ranking system 120 receives local scores of domain names from certain IPSs 115, the ranking system 120 can use these local scores for calculating global scores of the same domain names. In other embodiments, the ranking system 120 can use the local scores to complement the global scores of domain names. In yet more embodiments, the ranking system 120 can use the local scores to verify, cross-verify, correlate, or adjust global scores of the domain names.

Figure 4:
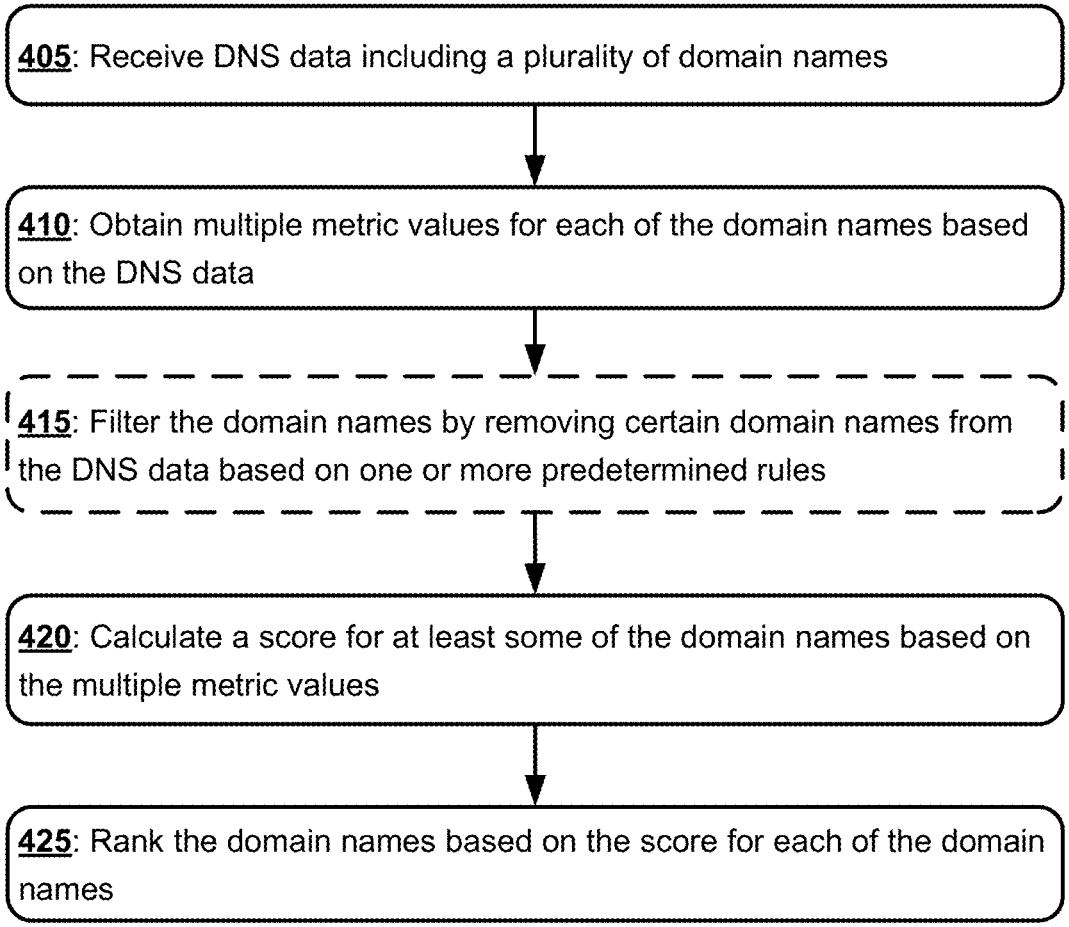
FIG. 4 is a flow chart of an example method for domain name ranking.

FIG. 4 is a flow chart of an example method 400 for domain name ranking, according to some embodiments. The method 400 for domain name ranking may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic resides at one or more components of the ranking system 120 or ranking agent 310 described above with reference to FIG. 1 and FIG. 3. Notably, the steps recited below may be implemented in an order different than described and shown in the figure. Moreover, the method 400 may have additional steps not shown herein, but which can be evident to those skilled in the art from the present disclosure. The method 400 may also have fewer steps than outlined below and shown in FIG. 3.

The method 400 for domain name ranking may commence at operation 405 with the ranking system 120 (or the ranking agent 310) receiving DNS data from one or more ISPs 115 or one or more DNSs 110. The DNS data can include a plurality of domain names. At operation 410, the ranking system 120 (or the ranking agent 310) can obtain, retrieve or calculate multiple metric values for each of the domain names based on the DNS data. The metric values may include a query count, a client count, and a network count associated with each or some of the domain names from the DNS data.

At optional operation 415, the ranking system 120 (or the ranking agent 310) can filter the domain names by removing certain domain names from the DNS data based on one or more predetermined rules. For example, rarely appearing domain names can be removed. Furthermore, domain names associated with unwanted, suspicious, malicious, or botnet activities can be detected and removed. Moreover, any illegal or unreadable domain names can be removed, as well as domain names pertaining to a predetermined type or having certain characteristics.

At operation 420, the ranking system 120 (or the ranking agent 310) can calculate a score for some or all of the domain names based on the multiple metric values obtained at the operation 410. The score can be calculated using the equation (1) presented above.

At operation 425, the ranking system 120 (or the ranking agent 310) ranks the domain names based on the score for each of the domain names. The ranking can include normalization of the scores and sorting the scores based on one or more predetermined rules. Furthermore, the ranks of the domain names can be outputted, sent to third parties (e.g., IPSs 115), visualized, displayed, used in further analysis or processing as described above.

Figure 5:
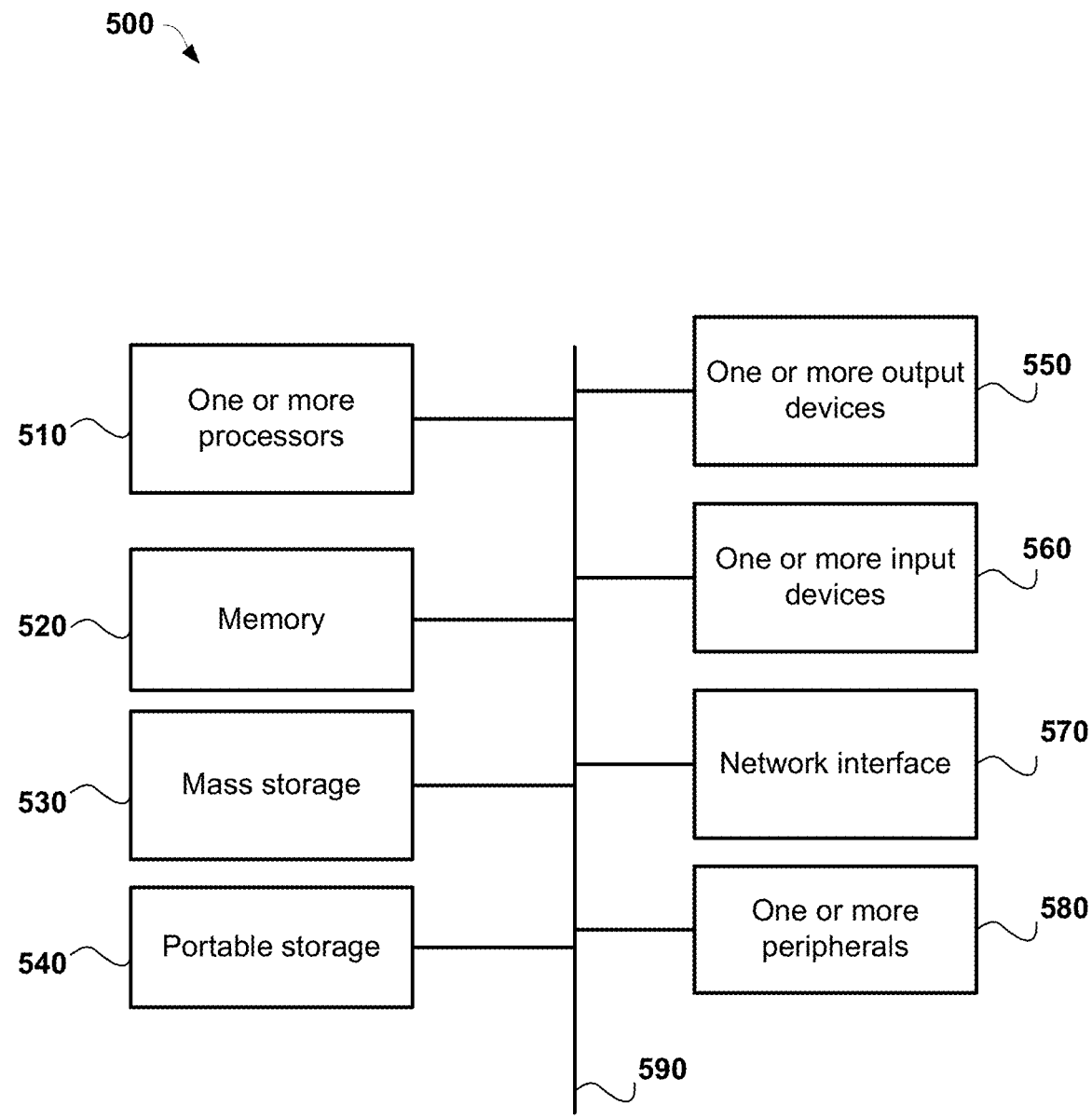
FIG. 5 is a computer system that may be used to implement the methods for domain name ranking.

FIG. 5 illustrates an exemplary computing system 500 that may be used to implement embodiments described herein. System 500 of may be implemented in the contexts of the likes of client device 105, the DNS server 110, the ranking system 120, and the ranking agent 310. The computing system 500 may include one or more processors 510 and memory 520. Memory 520 stores, in part, instructions and data for execution by processor 510. Memory 520 can store the executable code when the system 500 is in operation. The system 500 5 may further include a mass storage device 530, portable storage medium drive(s) 540, one or more output devices 550, one or more input devices 560, a network interface 570, and one or more peripheral devices 580.

The components shown in FIG. 5 are depicted as being connected via a single bus 590. The components may be connected through one or more data transport means. Processor 510 and memory 520 may be connected via a local microprocessor bus, and the mass storage device 530, peripheral device(s) 580, portable storage device 540, and network interface 570 may be connected via one or more input/output (I/O) buses.

Mass storage device 530, which may be implemented with a magnetic disk drive or an optical disk drive, is a non-volatile storage device for storing data and instructions for use by a magnetic disk or an optical disk drive, which in turn may be used by processor 510. Mass storage device 530 can store the system software for implementing embodiments described herein for purposes of loading that software into memory 520.

Portable storage medium drive(s) 540 operates in conjunction with a portable non-volatile storage medium, such as a compact disk (CD) or digital video disc (DVD), to input and output data and code to and from the computer system 500. The system software for implementing embodiments described herein may be stored on such a portable medium and input to the computer system 500 via the portable storage medium drive(s) 540.

Input devices 560 provide a portion of a user interface. Input devices 560 may include an alphanumeric keypad, such as a keyboard, for inputting alphanumeric and other information, or a pointing device, such as a mouse, a trackball, a stylus, or cursor direction keys. Additionally, the system 500 as shown in FIG. 5 includes output devices 550. Suitable output devices include speakers, printers, network interfaces, and monitors.

Network interface 570 can be utilized to communicate with external devices, external computing devices, servers, and networked systems via one or more communications networks such as one or more wired, wireless, or optical networks including, for example, the Internet, intranet, local area network (LAN), wide area network (WAN), cellular phone networks (e.g. Global System for Mobile (GSM) communications network, packet switching communications network, circuit switching communications network), Bluetooth radio, and an IEEE 802.11-based radio frequency network, among others. Network interface 570 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a Universal Serial Bus (USB).

Peripherals 580 may include any type of computer support device to add additional functionality to the computer system. Peripheral device(s) 380 may include a modem or a router.

The components contained in the computer system 500 are those typically found in computer systems that may be suitable for use with embodiments described herein and are intended to represent a broad category of such computer components that are well known in the art. Thus, the computer system 500 can be a personal computer (PC), hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a Central Processing Unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, methods and systems for DNS-based ranking of domains names have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

What is claimed is:

1. A computer-implemented method for domain name ranking to identify domain names that are any of high-risk, malicious, associated with malware, attacks or phishing, anomalous or suspicious, the computer-implemented method performed by one or more computers and comprising:
the one or more computers:
receiving Domain Name System (DNS) data, wherein the DNS data includes domain names and is received from one or more DNS servers;
based on the DNS data, obtaining multiple metric values for each of the domain names;
based on the multiple metric values, calculating a score for each of the domain names; and
ranking the domain names based on the score for each of the domain names to produce a current ranking;
generating a deviation metric value for each of the ranked domain names, the deviation metric value being distinct from the multiple metric values and the generation of the deviation metric value comprising: (a) receiving historical DNS data, wherein the historical DNS data includes the domain names with their respective historical scores periodically calculated over a predetermined period prior to the current ranking, wherein each of the domain names from the historical DNS data include multiple historical scores, and (b) calculating the deviation metric value for each of the domain names by comparing the scores of the domain names to the historical scores;
generating at least one of: a display and descriptive statistics, for use with a tool for analysis of domain names to identify domain names that are at least one of: high-risk, malicious, associated with malware, associated with attacks, associated with phishing, anomalous and suspicious;
wherein the at least one of the display and the descriptive statistics comprise the current ranking and a deviation metric value for each of the ranked domain names.

2. The method of claim 1, wherein, for each of the domain names, the metric values include a query count (QC), a client count (CC), and a network count (NC).

3. The method of claim 2, wherein the calculating of the score for each of the domain names includes applying the following equation to the metric values:

$$\text{Score} = NC \cdot CC \cdot (1 + \log(QC)).$$

4. The method of claim 1, wherein the domain names include one or more Fully Qualified Domain Names (FQDNs), one or more core domain names, and one or more subdomain names, and wherein the scores are calculated for each of the FQDNs, the core domain names, and the subdomain names.

5. The method of claim 4, wherein the calculating of the score for each of the core domain names includes combining scores of the subdomain names, which are associated with the same domain of the core domain names.

6. The method of claim 1, wherein the DNS data includes DNS data collected over a predetermined period, wherein the predetermined period is in a range from about 1 hour to about 24 hours.

7. The method of claim 1, further comprising converting the scores of the domain names into percentile ranks.

8. The method of claim 1, further comprising:
sorting the domain names based on the scores of the domain names; and
causing to display a list of at least part of the domain names with their corresponding ranks.

9. The method of claim 1, further comprising filtering the DNS data based on the metric values, wherein the filtering includes removing domain names which are associated with a QC being equal to one or a CC being equal to one.

10. The method of claim 1, further comprising filtering the DNS data by removing domain names having invalid or unreadable characters.

11. The method of claim 1, further comprising filtering the DNS data by removing domain names associated with a predetermined Internet Protocol (IP) standard or domain names associated with a predetermined domain name type.

12. The method of claim 1, wherein the DNS data is received from two or more DNS servers of two or more Internet Service Providers (ISPs).

13. The method of claim 1, wherein the calculating the score for each of the domain names includes calculating a local score for each of the domain names and calculating a global score for each of the domain names, wherein the local scores of the domain names are calculated based on local DNS data acquired within a single ISP, and wherein the global scores of the domain names are calculated based on global DNS data acquired from a plurality of ISPs.

14. The method of claim 13, further comprising transmitting the global scores of the domain names to one or more ISPs.

15. The method of claim 1, wherein the DNS data is accumulated by the one or more DNS servers from resolution of the domain names, over one or more minutes.

16. A computer-implemented system for domain name ranking to identify domain names that are any of high-risk, malicious, associated with malware, attacks or phishing, anomalous or suspicious, the computer-implemented system comprising at least one processor and at least one memory storing processor-executable codes, wherein the at least one processor is configured to:
receive DNS data, wherein the DNS data includes domain names and is received from one or more DNS servers;
based on the DNS data, obtain multiple metric values for each of the domain names;
based on the multiple metric values, calculate a score for each of the domain names; and rank the domain names based on the score for each of the domain names to produce a current ranking;

generate a deviation metric value for each of the ranked domain names, the deviation metric value being distinct from the multiple metric values and the generation of the deviation metric value comprising: (a) receiving historical DNS data, wherein the historical DNS data includes the domain names with their respective historical scores periodically calculated over a predetermined period prior to the current ranking, wherein each of the domain names from the historical DNS data include multiple historical scores, and (b) calculating the deviation metric value for each of the domain names by comparing the scores of the domain names to the historical scores;

generate at least one of: a display and descriptive statistics, for use with a tool for analysis of domain names to identify domain names that are at least one of: high-risk, malicious, associated with malware, associated with attacks, associated with phishing, anomalous and suspicious wherein the at least one of the display and the descriptive statistics comprise the current ranking and a deviation metric value for each of the ranked domain names.

17. The system of claim 16, wherein the DNS data includes global DNS data obtained from a plurality of ISPs such that the scores for the domain names represent global scores of the domain names, and wherein the global scores of the domain names are available to the plurality of ISPs.

18. The system of claim 16, wherein the DNS data includes local DNS data obtained by a single ISP such that the scores for the domain names represent local scores of the domain names, and wherein the local scores of the domain names are not available externally to the single ISP.

19. A non-transitory computer-readable storage medium having instructions stored thereon, which when executed by one or more processors, cause the one or more processors to implement a method on one or more computers, comprising:

the one or more computers:
receiving Domain Name System (DNS) data, wherein the DNS data includes domain names and is received from one or more DNS servers;

based on the DNS data, obtaining multiple metric values for each of the domain names;

based on the multiple metric values, calculating a score for each of the domain names; and ranking the domain names based on the score for each of the domain names to produce a current ranking;

generating a deviation metric value for each of the ranked domain names, the deviation metric value being distinct from the multiple metric values and the generation of the deviation metric value comprising: (a) receiving historical DNS data, wherein the historical DNS data includes the domain names with their respective historical scores periodically calculated over a predetermined period prior to the current ranking, wherein each of the domain names from the historical DNS data include multiple historical scores, and (b) calculating the deviation metric value for each of the domain names by comparing the scores of the domain names to the historical scores;

generating at least one of: a display and descriptive statistics, for use with a tool for analysis of domain names to identify domain names that are at least one of: high-risk, malicious, associated with malware, associated with attacks, associated with phishing, anomalous and suspicious;

wherein the at least one of the display and the descriptive statistics comprise the current ranking and a deviation metric value for each of the ranked domain names.

* * * * *